(12) United States Patent
Fagan et al.

(10) Patent No.: US 7,525,280 B2
(45) Date of Patent: Apr. 28, 2009

(54) MULTI-TYPE BATTERY CHARGER CONTROL

(75) Inventors: Jerry T. Fagan, Johnson City, TN (US); Antonio Trigiani, Bristol, TN (US)

(73) Assignee: Diversified Power International, LLC, Piney Flats, TN (US)

( * ) Notice: Subject to any disclaimer, the term of this patent is extended or adjusted under 35 U.S.C. 154(b) by 0 days.

(21) Appl. No.: 11/538,206

(22) Filed: Oct. 3, 2006

(65) Prior Publication Data

US 2007/0080660 A1 Apr. 12, 2007

Related U.S. Application Data

(63) Continuation of application No. 11/124,065, filed on May 6, 2005, now abandoned.

(60) Provisional application No. 60/569,166, filed on May 7, 2004.

(51) Int. Cl.
*H02J 7/00* (2006.01)

(52) U.S. Cl. ........................ 320/106; 320/107; 320/110

(58) Field of Classification Search ................. 320/106, 320/110, 107, 125, 160, 112, 113
See application file for complete search history.

(56) References Cited

U.S. PATENT DOCUMENTS

| | | | | |
|---|---|---|---|---|
| 5,233,281 | A * | 8/1993 | Chiang et al. | 320/110 |
| 5,280,229 | A * | 1/1994 | Faude et al. | 320/110 |
| 5,742,149 | A * | 4/1998 | Simpson | 320/113 |
| 6,404,164 | B1 | 6/2002 | Bean et al. | |
| 6,456,037 | B1 * | 9/2002 | Jakl et al. | 320/106 |

* cited by examiner

*Primary Examiner*—Edward Tso
*Assistant Examiner*—Alexis Boateng
(74) *Attorney, Agent, or Firm*—Knox Patents; Thomas A. Kulaga

(57) ABSTRACT

An apparatus for selectively charging a variety of batteries. A battery charging system includes a charging circuit, a processor, and a key, or identification device. The key has a value or code associated with the type of battery to be charged. The processor executes a software program that reads the value associated with the key. The software program charges the battery in a manner required by the battery type associated with the key value. In another embodiment, the program checks for changes to the key, such as when an operator swaps the key during charging.

18 Claims, 3 Drawing Sheets

MULTI-TYPE BATTERY CHARGER CONTROL

CROSS-REFERENCE TO RELATED APPLICATIONS

This application is a continuation of prior application Ser. No. 11/124,065, filed May 5, 2005, which claims the benefit of Provisional Application No. 60/569,166, filed May 7, 2004.

STATEMENT REGARDING FEDERALLY SPONSORED RESEARCH OF DEVELOPMENT

Not Applicable

BACKGROUND OF THE INVENTION

1. Field of Invention

This invention pertains to a battery charging system capable of charging different types of batteries. More particularly, this invention pertains to a battery charging system with a user operable switch that selects the type of battery to be charged and controls the charging system to charge the battery in accordance with its type.

2. Description of the Related Art

Chemical batteries that create electricity from chemical reactions have been known for many years. These types of batteries are used in automobiles and other vehicles, uninterruptible power supply (UPS) systems, and portable electric devices, among other devices and equipment. An advantage of some chemical batteries is that they can be charged and the chemical process reversed by forcing electricity through the battery. Charging systems are widely known in the art and are widely available.

Examples of rechargeable batteries include batteries made with nickel metal hydride (NiMh), nickel cadmium (NiCd), lithium ion (Li-ion), lithium/manganese dioxide ($Li/MnO_2$), lithium/titanium disulfide ($Li/TiS_2$), Lithium/iron sulfide (LiFeSx), Lithium/manganese titanium (LiMnTi), lithium/nickel oxide positive electrode ($LiNiO_2$), Lithium/manganese oxide ($LiMn_2O_4$), nickel-zinc (Ni—Zn), Nickel-iron (NiFe), or Silver oxide (AgO). Such batteries also include a variety of lead-acid storage batteries, such as gel, wet, and absorbed glass mat (AGM) batteries. Each of these battery types have specific charging requirements, and these requirements can also vary depending upon the application and construction of the batteries.

Charging is the process of returning a discharged battery to a state in which it can be used again. There are various methods commonly used for recharging batteries: constant-current, constant potential (or voltage), float, pulse, ripple, taper, and trickle. It is important to charge a battery with the method recommended by the manufacturer for the type of battery. Although attempts have been made to sense the battery type by measuring the battery's electrical characteristics, such attempts have not been entirely successful.

BRIEF SUMMARY OF THE INVENTION

According to one embodiment of the present invention, an operator switch for controlling the battery charging for a specific type of battery is provided. A battery charging system includes a charging circuit, a processor, and a key, or identification device. The key has a value or code associated with the type of battery to be charged. The processor executes a software program that reads the value associated with the key. The software program charges the battery in a manner required by the battery type associated with the key value. In another embodiment, the program checks for changes to the key, such as when an operator swaps the key during charging.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for selectively charging a variety of batteries is disclosed. The apparatus is illustrated in the figures as a battery charging system 10. The battery charging system 10 is adapted to charge a variety of different types of batteries by varying the charging method and controlling the charging parameters.

Figure 1:
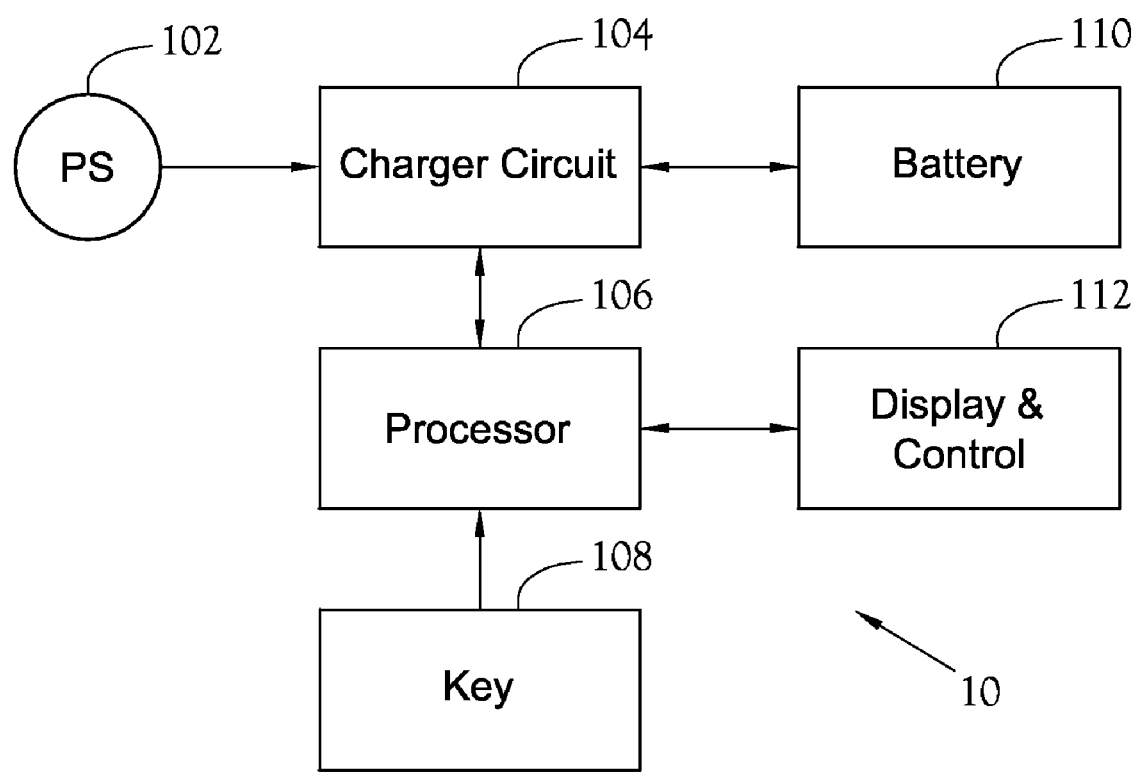
FIG. 1 is a block diagram of one embodiment of a battery charging system.

FIG. 1 illustrates a battery charging system 10 capable of charging different types of batteries 110. A charging circuit 104 is powered by a power supply 102. The charging system 10 includes a processor 106 that controls the charging circuit 104 and provides display and control 112. A key, or identification device, 108 operates a switch such that the processor 106 can determine the type of battery 110 for selecting the proper charging method.

As used herein, the processor 106 should be broadly construed to mean any computer or component thereof that executes software. The processor 106 includes a memory medium that stores software, a processing unit that executes the software, and input/output (I/O) units for communicating with external devices. Those skilled in the art will recognize that the memory medium associated with the processor 106 can be either internal or external to the processing unit of the processor without departing from the scope and spirit of the present invention. In one embodiment the processor 106 is a general purpose computer, in another embodiment, it is a specialized device for implementing the functions of the invention. Those skilled in the art will recognize that the processor 106 includes an input component, an output component, a storage component, and a processing component. The input component receives input from external devices, such as the charging circuit 104 and the key 108. The output component sends output to external devices, such as the charging circuit 104 and the display and control circuit 112. The storage component stores data and program code. In one embodiment, the storage component includes random access memory. In another embodiment, the storage component includes non-volatile memory, such as floppy disks, hard disks, and writeable optical disks. The processing component executes the instructions included in the software and routines.

The processor 106 executes a software program charging different types of batteries. The program includes routines for charging different types of batteries 110. The routines control the voltage, current, time and rate of charge, as appropriate to the type of battery 110 to be charged. The key, or identification device, 108 includes a code that identifies a type of battery 110 and the key's 108 code is read by the processor 106. In this manner, the charging system 10 applies the proper charge to a battery 110 as specified by the key 108.

In one embodiment, the key 108 is a physical key that is plugged into a receptacle in the charging system 10. The key 108, either mechanically or electrically, sets one or more switches to a specific configuration, which is read by the processor 106. For example, the key 108, when inserted in the receptacle, actuates a series of switches such that individual contacts are either grounded or raised to a specific voltage level, and the contacts correspond to a digital code defined by the key 108. The contacts are connected to an equal number of input/output (I/O) ports on the processor 106. The processor 106 reads the I/O ports to determine the state of the contacts, and thereby determines the code carried by the key 108. The software running on the processor 106 uses the code to select the manner of charging the battery 110.

In another embodiment, the key 108 is an electronic device that is plugged into a receptacle in the charging system 10. The key 108 contains a digital code that is read by the processor 106. In still another embodiment, the key 108 is a multi-position switch on the charging system 10, with each switch position representing a battery type.

The battery type varies depending upon the battery 110 to be charged by the charging system 10. The battery types include differences in chemistry type, size, capacity, voltage rating, number of cells and their configuration. Different battery types require different charging protocols, which is the manner of applying the proper voltage and/or current to the battery 110 for the proper time. The charging protocol optimizes the battery life for the battery type while permitting rapid charging of the battery 110. For example, a NiMH battery can be charged at a low, fixed current less than its C capacity for a specified period of time before being charged at 100% of C until a negative delta voltage is detected at the battery 110, at which time a trickle charge is applied to the battery 110.

The number of battery types that the charging system 10 is adapted to charge is dependent upon the number of bits or pins making up the I/O port on the processor 106. In one embodiment, the I/O port includes two switches connected to two pins on the processor 106 for a total of four different battery types. In another embodiment, the I/O port includes four switches for a total of sixteen different battery types. Those skilled in the art will recognize that the number of bits used to define the various battery types can vary without departing from the spirit and scope of the present invention. In these embodiments, the code from the key, or identification device, 108 is transferred to the processor 106 as parallel data. In still another embodiment, the code from the key 108 is transferred to the processor 106 as serial data.

In one embodiment, the display and control 112 includes a light emitting diode (LED) display of the voltage of the battery 110. In various embodiments, the display is a bar graph display indicating the state of charge of the battery 110 and is actuated by a pushbutton or other control. In other embodiments, the display and control 112 includes one or more single or multicolored LEDs indicating the status of the charging system 10, for example, powered up, battery polarity is correct, charging stage, and charging completed.

In another embodiment, the display and control 112 includes indication of the type of battery 110 to be charged, as specified by the key 108. In one embodiment, an LED or other indicating lamp flashes a number of times corresponding to the type of battery 110 specified by the key 108. In another embodiment, an alphanumeric display presents information relating to the type of battery 110 specified by the key 108.

Figure 2:
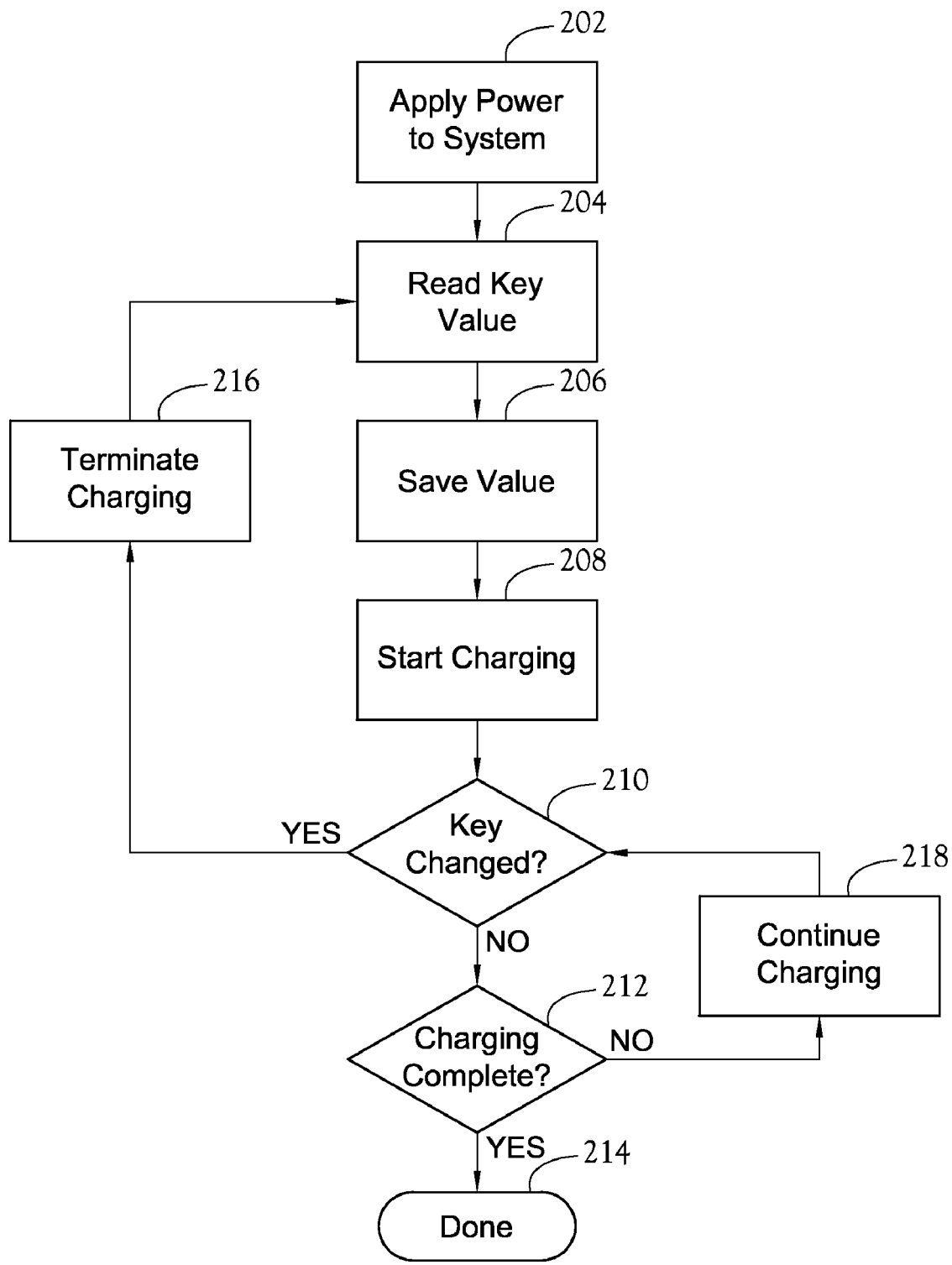
FIG. 2 is a flow diagram of one embodiment of the steps for varying the manner of charging the battery based on a key value.

FIG. 2 is a flow diagram of one embodiment of the steps for varying the manner of charging the battery 110 based on a code stored in the key 108. Initially, power is applied 202 to the charging system 10. In one embodiment, the power is supplied by a power supply 102, such as a 120 volt ac power main. In another embodiment, the power for the processor 106 and the display and control circuit 112 is supplied by the battery 110 to be charged, with the power for charging the battery 112 coming from an external power supply 102.

With power supplied 202 to the charging system 10, the processor 106 executes a software program that reads the value 204 associated with the key 108. In one embodiment, the value is saved or stored 206 in memory. In another embodiment, the processor 106 uses the value directly, without resort to a memory location. The software program then starts the charging routine 208. In one embodiment, the charging routine 208 is specific to the type of battery corresponding to the value associated with the key 108. In this embodiment, the charging routine 208 corresponding to the charging protocol required by the specified battery type is selected and then executed by the processor 106. In another embodiment, a single charging routine 208 selects and applies a charging protocol specific to the battery type as specified by the key value 204.

In either embodiment, the charging routine 208 controls the charging circuit 104 by applying the appropriate charging protocol to the specified battery type. The charging protocol includes applying the proper voltage and/or current to the battery 110 for the proper time in accordance with the requirements of the battery type of the battery 110 being charged. That is, the charging routine 208 controls the charging circuit 104 such that the charging circuit 104 charges the battery 110 in the manner required for that type of battery. The charging routine 208, in one embodiment, monitors characteristics of the battery 110, such as voltage and temperature, and the charging routine 208 uses the value of these characteristics to adjust the charger circuit 104.

After starting charging 208, the next step is to check the value of the key 108 to determine if the value has changed 210, which indicates whether the operator has changed the key 108. If the value of the key 108 has changed, charging is terminated 216 and the software repeats the steps of reading the value 204, saving the value 206, and starting charging 208. If the value has not changed, the software checks to determine whether charging is complete 212. In various embodiments, charging is complete 212 when the battery voltage reaches a specified value, the applied current reaches a specified value, a specified time has elapsed, or other requirement, as determined by the type of battery being charged, is satisfied. If charging is not complete, the system 10 continues charging 218 and checks for the key value being changed 210. If charging is complete, the routine is done 214. In various embodiments, the order of the steps of checking the key value 210 and checking for completion of charging 214 are performed in either order.

In one embodiment, after the value of the key 108 is read 204, the value is displayed via the display and control 112. In one embodiment, the value displayed is a text display taken from a lookup table correlating key values to battery types. In other embodiments, one or more LEDs or other indicating lamps are illuminated in a pattern or by flashing in such a manner as to indicate the battery type corresponding to the key value.

In one embodiment, each of the functions identified in FIG. 2 are performed by one or more software routines run by the processor 106. In another embodiment, one or more of the functions identified are performed by hardware and the remainder of the functions are performed by one or more software routines run by the processor 106. In still another embodiment, the functions are implemented with hardware, with the processor 106 providing routing and control of the entire integrated system 10.

The processor 106 executes software, or routines, for performing various functions. These routines can be discrete units of code or interrelated among themselves. Those skilled in the art will recognize that the various functions can be implemented as individual routines, or code snippets, or in various groupings without departing from the spirit and scope of the present invention. As used herein, software and routines are synonymous. However, in general, a routine refers to code that performs a specified function, whereas software is a more general term that may include more than one routine or perform more than one function. Those skilled in the art will recognize that it is possible to program a general-purpose computer or a specialized device to implement the invention.

Figure 3:
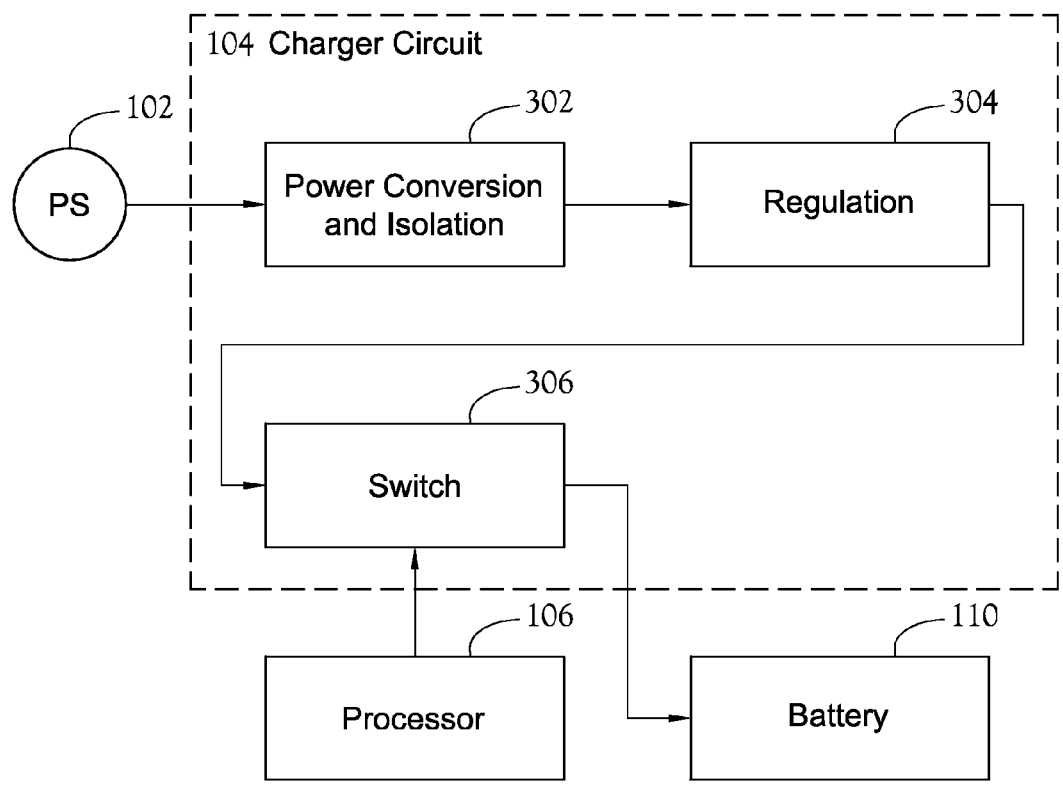
FIG. 3 illustrates one embodiment of a battery charging system showing a switching network.

FIG. 3 illustrates one embodiment of the charging system 10 with variable duty-cycle pulse width regulation. In this embodiment, the charger circuit 104 includes a power conversion and isolation circuit 302, a regulation circuit 304, and a switch 306. The power conversion and isolation circuit 302, in one embodiment, provides two functions. First, the power conversion and isolation circuit 302 converts the voltage level at the power supply 102 to a voltage level compatible with the battery 110 to be charged. Second, the power conversion and isolation circuit 302 provides isolation between the battery 110 and the source, or power supply, 102. In another embodiment, isolation is not used and the power conversion circuit 302 performs only the power conversion function. In one embodiment, the power conversion and isolation circuit 302 includes a step down transformer and rectifier circuit. In another embodiment, the power conversion and isolation circuit 302 includes a switching power supply.

The regulator circuit 304 takes the output of the power conversion circuit 302 and treats it to ensure it is a stable direct current (dc) voltage source. The output of the regulator circuit 304 passes through the switch 306, which switches the input voltage in a controlled manner to produce a pulse stream. The switch 306 is controlled by the processor 106. In one embodiment, an output I/O pin on the processor 106 is controlled by a software program, and the processor 106 output provides the signal for controlling the switch 306. The software program varies the width 402, 402' and the space 404, 404' of the pulse streams 410, 410' (see FIGS. 4 and 5) based on the requirements demanded by the charging routine corresponding to the type of battery 110 being charged and the current stage of the charging cycle.

In various embodiments, the switch 306 includes a switching transistor, a MOSFET, or other device that chops a dc signal to produce a pulse stream. In one embodiment, the switch 306 includes a filter circuit that treats the pulse stream to remove harmonics. In one embodiment, the switch 306 includes a smoothing circuit that treats the pulse stream to produce a substantially constant dc output signal.

Figure 4:
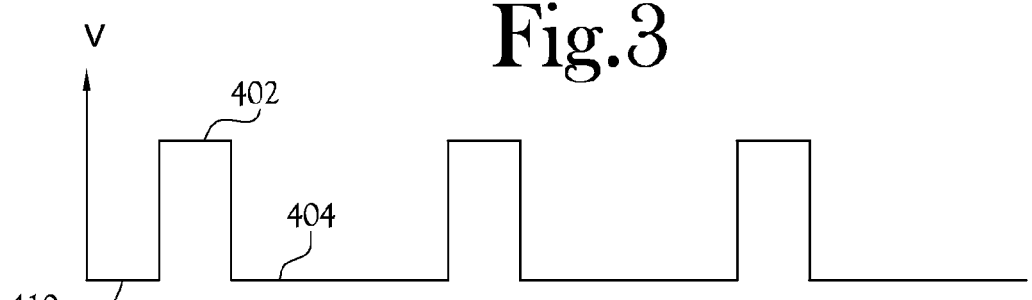
FIG. 4 illustrates a narrow pulse waveform having a low effective voltage.
Figure 5:
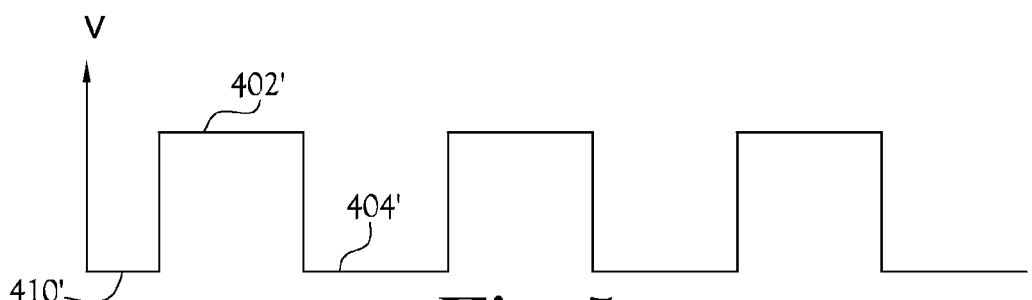
FIG. 5 illustrates a wider pulse waveform having a high effective voltage.

FIGS. 4 and 5 illustrate two pulse streams 410, 410'. The pulse streams 410, 410' illustrated in FIG. 4 shows a pulse having a width (on time) 402, 402' corresponding to the on cycle of the switch 306 and a space, or gap, (off time) 404, 404' corresponding to the off cycle of the switch 306. The processor 106 controls both the width 402, 402' and the frequency (that is, the period, which is a combination of the width 402, 402' and the space 404, 404') of the pulse streams 410, 410'. A narrow pulse stream 410 as illustrated in FIG. 4 results in a lower average voltage, whereas a wider pulse stream 410' as illustrated in FIG. 5 results in a higher average voltage output from the switch 306.

In the embodiment illustrated in FIGS. 3 to 5, the power conversion and isolation circuit 302 and regulator circuit 304 provides a constant output voltage. The output voltage is switched by the switch 306 so as to produce a controlled RMS voltage output to the battery 110. In this manner, the power conversion circuit 302 operates at a constant efficiency regardless of the voltage of the battery 110 being charged. For example, in one embodiment, an output voltage of 30 volts from the power conversion circuit is adequate to charge batteries 110 of either 6, 12, or 24 volts. With this configuration, it is not necessary to control the power conversion circuit 302, such as by selecting taps on a transformer, in order to control the voltage applied to the battery 110.

The charging system 10 includes various functions. The function of identifying a specified battery type is implemented, in one embodiment, by an identification device, or key, 108 that operates at least one switch to produce a code read by the processor 106 that corresponds to the battery type associated with the key 108. In another embodiment, the function is implemented by an identification device 108 that contains the battery type information stored as a code in the key 108. The processor 106 accesses the code in the key 108.

The function of determining if the specified battery type changes is implemented, in one embodiment, by the processor 106, which includes a routine for monitoring the battery type value controlled by the key 108. The processor 106 periodically queries the battery type value set by the key 108, and if the key value changes 210 then charging is terminated 216 and the new key value is read 204.

The function of providing a variable duty cycle pulse width regulation output to the battery is implemented, in one embodiment, by a switching circuit 306 between the power conversion circuit 302 and the battery 110 to be charged. The switching circuit 306 is controlled by the processor 106, and the switching circuit 306 interrupts the constant voltage from the power conversion circuit 302 to produce a variable duty cycle pulse stream as illustrated in FIGS. 4 and 5.

The function of isolating said external power source from the battery being charged is implemented, in one embodiment, by an isolation circuit in the power conversion and isolation circuit 302 in the charger circuit 104 of the charging system 10.

The function of monitoring a charge state of the battery being charged is implemented, in one embodiment, by the processor 106, which includes a routine for monitoring characteristics and variables related to the battery 110. In various embodiments, the characteristics and variables include battery temperature, time, voltage, current, temperature with respect to time, voltage with respect to time, and/or current with respect to time.

The function of regulating an output from said power conversion circuit is implemented, in one embodiment, by the regulation circuit 304 illustrated in FIG. 3. In one embodiment, the battery 110 is charged with a constant voltage output from the charging system 10. In another embodiment, the battery 110 is charged with a constant current output from the charging system 10. In these embodiments, the processor 106 controls the switch 306 to ensure that the proper voltage and/or current is applied to the battery 110 for the proper length of time. The charging system 10 includes charging protocols for a wide variety of battery types, and the specific charging protocol required by the battery 110 to be charged is selected by use of the key, or identification device, 108.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for charging a battery, said apparatus comprising:
    an identification device associated with a code that identifies a specified charging protocol method, said identification device being a plug-in device releasably connected to a processor, said identification device independent of the battery, said identification device not physically attached to or housed with the battery when said identification device is connected to said processor;
    a charger circuit including a power conversion circuit and a switch, said power conversion circuit configured to connect to an external power source, said power conversion circuit having an output providing power to said switch, said switch generating a variable duty cycle pulse width regulation output, said charger circuit configured to electrically connect to the battery;
    a processor in communication with said switch, said processor programmed to execute a process for charging the battery, said process including reading a code identifying a specified charging protocol method, selecting a charging protocol corresponding to said code, controlling said switch to charge the battery in a manner determined by said charging protocol, monitoring to detect a replacement of said identification device with the battery remaining connected to said charger circuit, and after detecting said replacement, said process steps of reading said code, selecting said charging protocol, and controlling said switch are performed with a new code associated with a replacement identification device; and
    whereby said apparatus applies said charging protocol to the battery by switching in output of said power conversion circuit.

2. The apparatus of claim 1 wherein said identification device is selected from a group including a memory device and a key, said memory device having a memory storage component in communication with said processor, said memory storage component storing said code corresponding to said specified charging protocol method, and said key configured for operating at least one switch in communication with said processor.

3. The apparatus of claim 1 wherein said process further includes monitoring to detect a removal of said identification device with the battery remaining connected to said charger circuit, and after detecting said removal, said process step of controlling said switch is terminated.

4. The apparatus of claim 1 wherein said process executed by said processor further includes monitoring a charge state of the battery being charged by said apparatus.

5. The apparatus of claim 1 wherein said process executed by said processor further includes monitoring a charge state of the battery being charged by said apparatus and terminating charging when said charge state indicates charging is complete.

6. The apparatus of claim 1 further including a means for monitoring a charge state of the battery being charged.

7. The apparatus of claim 1 further including an isolation circuit between said external power source and an output of said charger circuit.

8. The apparatus of claim 1 further including a regulator connected between said power conversion circuit and said switch.

9. A method in a battery charger for charging a battery, said method comprising the steps of:
    a) reading a code associated with a first key, said first key being a plug-in device independent of the battery to be charged, said key not physically attached to or housed with the battery during said step of reading;
    b) selecting a charging protocol corresponding to said code;
    c) controlling a switch to generate a pulse output in accordance with said charging protocol, said switch receiving power from a power conversion circuit, said switch configured to send said pulse output to the battery; and
    d) monitoring to detect a removal of said first key and an insertion of a second key having an associated code, said removal occurring without removing the battery, and if said insertion is detected, repeating said steps starting at step a) with said second key being read instead of said first key.

10. The method of claim 9 further including, after said step c), a step of monitoring a charge state of the battery being charged by said apparatus and a step of terminating said pulse output from said switch when said charge state indicates charging is complete.

11. The method of claim 9 further including a step of displaying a status of the battery charger.

12. The method of claim 9 further including a step of isolating a connection to the battery from an external power supply, said power conversion circuit configured to receive power from said external power supply.

13. The method of claim 9 further including a step of regulating power from said power conversion circuit to said switch.

14. A system for charging a battery, said system comprising:
    a key associated with a code, said key independent of the battery, said key being a plug-in device received by a receptacle, said key not physically attached to or housed with the battery when said key is received by said receptacle;
    a charger circuit including a power conversion circuit and a switch, said power conversion circuit configured to connect to an external power source, said power conversion circuit connected to said switch, said switch configured to generate a variable duty cycle pulse width signal as an output, said switch configured to connect said output to the battery;
    a storage component storing said code;
    an input/output component communicating with said key and said charger circuit; and
    a processing component communicating with said storage component and said input/output component, said processing component executing a process including
    reading said code associated with said key,
    saving said code in said storage component, and
    controlling said switch to charge the battery with a charging protocol corresponding to said code, monitoring for a change of said key, and providing for terminating charging if said key is removed while the battery is connected to said switch.

15. The system of claim 14 wherein said process executed by said processing component further includes a step of monitoring for insertion of said key and a step of starting charging when said key is inserted whereby starting charging includes reinitiating said steps of reading, saving, and controlling.

16. The system of claim 14 wherein said key is selected from a group including a memory device and a switch device, said memory device having a memory storage component in communication with said processor, said memory storage component storing said code corresponding to said charging protocol, and said switch device configured for operating at least one switch in communication with said processor.

17. The system of claim 14 wherein said process executed by said processing component further includes a step of monitoring a charge state of a battery being charged by said system.

18. The system of claim 14 wherein said process executed by said processing component further includes a step of monitoring a charge state of a battery being charged by said apparatus and a step of terminating charging when said charge state indicates charging is complete.

* * * * *